United States Patent

[11] 3,618,088

[72] Inventor Thompson J. Simpson, Sr.
  Falls Church, Va.
[21] Appl. No. 14,418
[22] Filed Feb. 26, 1970
[45] Patented Nov. 2, 1971
[73] Assignee The United States Government as represented by the Administrator of the Federal Aviation Administration

[54] SECOND-TIME-AROUND ECHO IMMUNE RADAR SYSTEM
  3 Claims, 2 Drawing Figs.

[52] U.S. Cl. .................................................... 343/7.7, 343/6 TV
[51] Int. Cl. .................................................. G01s 7/06, G01s 9/42
[50] Field of Search ........................................... 343/7.7, 6 TV

[56] References Cited
UNITED STATES PATENTS

| | | | |
|---|---|---|---|
| 2,597,636 | 5/1952 | Hall et al. ..................... | 343/7.7 |
| 2,746,033 | 5/1956 | Bachmann ..................... | 343/7.7 |
| 3,122,738 | 2/1964 | Raabe ........................... | 343/7.7 |
| 3,281,840 | 10/1966 | Feten ............................ | 343/7.7 |

Primary Examiner—Malcolm F. Hubler
Attorneys—Charles K. Wright, Jr., William G. Gapcynski and Lawrence A. Neureither ABSTRACT: A radar system for eliminating second-time-around echoes while simultaneously providing protection against radar "blind speed" problems. The invention provides two radar systems utilizing a common antenna and operating at two different frequencies and at two different pulse repetition rates. The video outputs from each system are combined to yield the target display.

INVENTOR
THOMPSON J. SIMPSON, SR.
BY Charles K Wright Jr
ATTORNEY

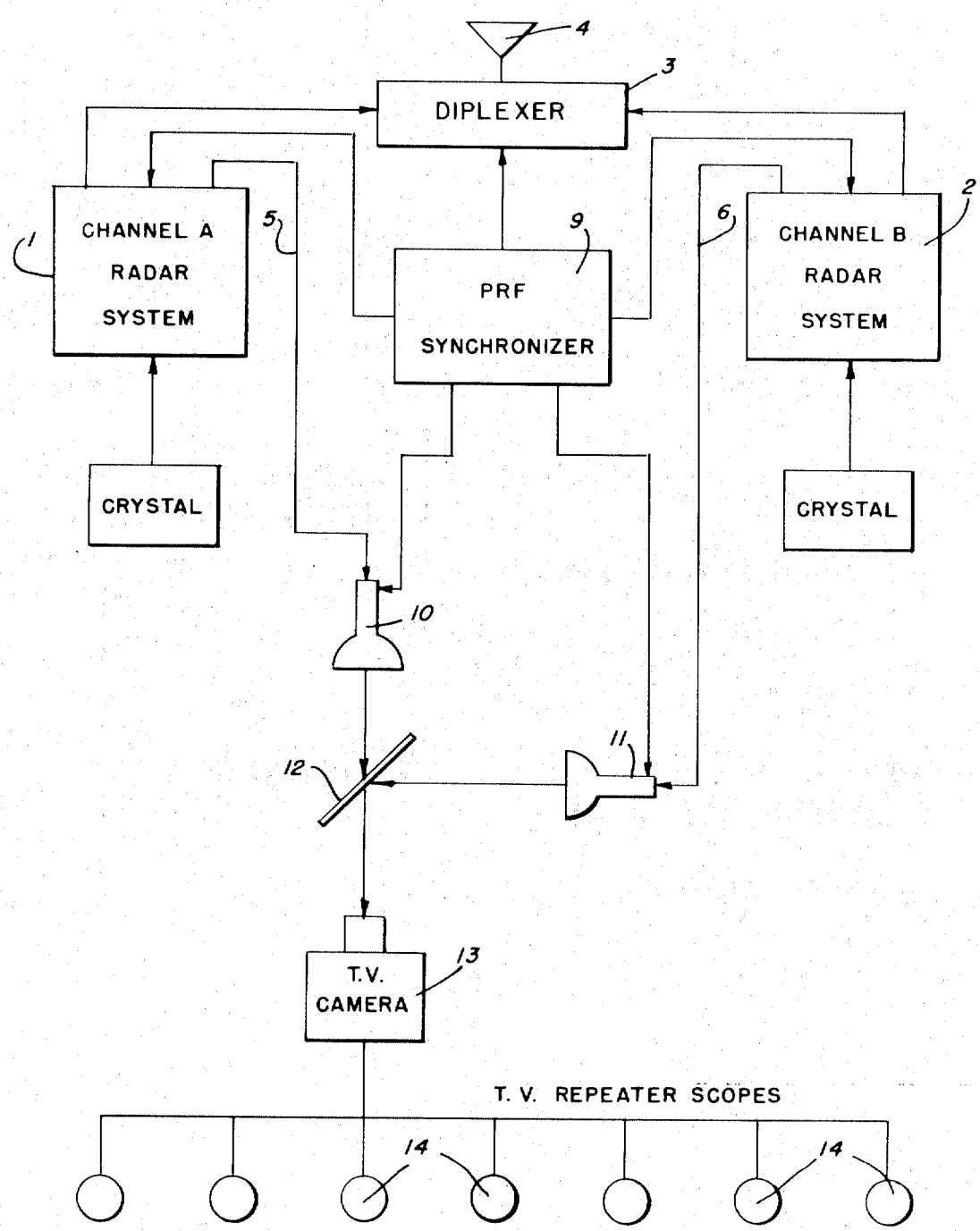

SECOND-TIME-AROUND ECHO IMMUNE RADAR SYSTEM

The invention described herein may be manufactured and used by or for the Government for governmental purposes without the payment to me of any royalty thereon.

BACKGROUND OF THE INVENTION

1. Field of the Invention

This invention is an improved radar system which removes second-time-around echoes from a radar display while also providing protection against radar "blind speed" problems.

2. Description of the Prior Art

The second-time-around echo occurs when an extremely large fixed target such as a mountain range or large thunderstorm exists at a radar range just beyond the normal listening period of the radar receiving system. Second-time-around echo normally affects short-range radar systems such as an approach control facility where the maximum radar range is usually limited to 40 to 60 miles. A consideration of the operation of a typical short-range radar system will show how the second-time-around radar problem arises. Consider a short-range radar system whose listening period is limited to 50 miles. After the transmitter is fired for an appropriate period of time, the signal package travels outbound from the radar antenna at the velocity of light, during which time the receiver is in a listening mode. When the pulse package is 50 miles distant from the radar antenna, the receiver listening period is cut off, the transmitter is fired again, and the entire sequence is repeated, the rate of repetition being defined as the pulse recurrence frequency (PRF) of the system. Meanwhile, the first pulse package continues its outbound travel and at a range of 70 miles assume that it illuminates a large mountain. At the time the first pulse package intercepts the mountain, the receiver has been in its second listening period for approximately 20 miles of range. The energy returned from the mountain, if it is of sufficient magnitude, will indicate a target in the "second listening" period of the receiver at the false range of 20 miles from the radar. Such targets are difficult to distinguish from similar targets which are in proper range registration. Familiarity with the surrounding site terrain and behavior of the specific radar are to date the best means of determining if the target is real or false.

The chief degrading effect of second-time-around echoes is that they are not responsive to Doppler Moving Target Indicator (MTI) processing, hence they appear as large, annoying patches of clutter, which can obliterate target information. The reason that second-time-around echoes are not removed by MTI processing is because there is no signal coherence from one listening period to the next in the case of magnetron radar transmitters because of the random phase firing of magnetrons. A coherent radar transmitter, such as a crystal-controlled klystron, can be employed and MTI processing can be utilized to eliminate the second-time-echo; however, such a system immediately becomes relegated to a single value PRF which the system vulnerable to blind speeds, a phenomenon unique to Doppler MTI radar systems. The blind speed exists in an MTI system under conditions where a moving target has a radial velocity with respect to the radar such that the target moves one complete wavelength of the transmitting frequency during one PRF interval.

In conventional approach radar systems the "blind speed" problem is circumvented to a great extent by staggering the PRF, that is, the PRF changes value from one pulse interval to the next. Utilization of intrachannel PRF staggering to avoid the "blind speed" problem will, where a coherent radar system is used, destroy the coherence from one listening period to the next and will thus render the coherent system vulnerable to the second-time-around echo. The need for staggered PRF to combat the "blind speed" problem and the maintenance of frequency coherence to prevent second-time-around echoes thus constitutes an incompatible requirement.

SUMMARY OF THE INVENTION

This invention maintains frequency coherence and permits the use of a staggered PRF, thus preventing "blind speed" problems and second-time-around echoes. This is accomplished by using two coherent radar channels, each operating on a different wavelength and at a different PRF. Staggering will now be accomplished between individual channels rather than within one specific channel. A PRF synchronizer is provided to establish a predetermined cyclic repetition between the two PRF's so that the video outputs of the two channels may be properly realigned and to prevent both transmitter channels from firing at the same time.

This invention thus provides for coherence from one listening period to the next, thereby permitting the MTI circuitry of each channel to operate effectively to remove second-time-around echoes. Since each channel is operating on a single-value PRF to maintain coherence and the values of the PRF for each respective channel are different, when a blind speed occurs in one channel, the other channel will not have the same blind speed, hence a video output will be maintained and no loss of signal information will occur. The use of two radar channels automatically gives rise to frequency diversity which improves the probability of target detection. Also since two radar channels are used, the reliability of the overall system is improved, and failure of one channel can be readily noticed and repaired.

Accordingly, it is an object of this invention to provide a radar system which eliminates second-time-around echoes and prevents loss of signal information due to the blind speed effect.

It is a further object of this invention to provide a radar system in which the probability of target detection is increased.

It is also an object of this invention to provide a radar system in which the reliability of the system is greatly increased.

BRIEF DESCRIPTION OF THE DRAWINGS

FIGS. 1 and 2 are each functional block diagrams of the invention.

DESCRIPTION OF THE PREFERRED EMBODIMENT

Figure 1:
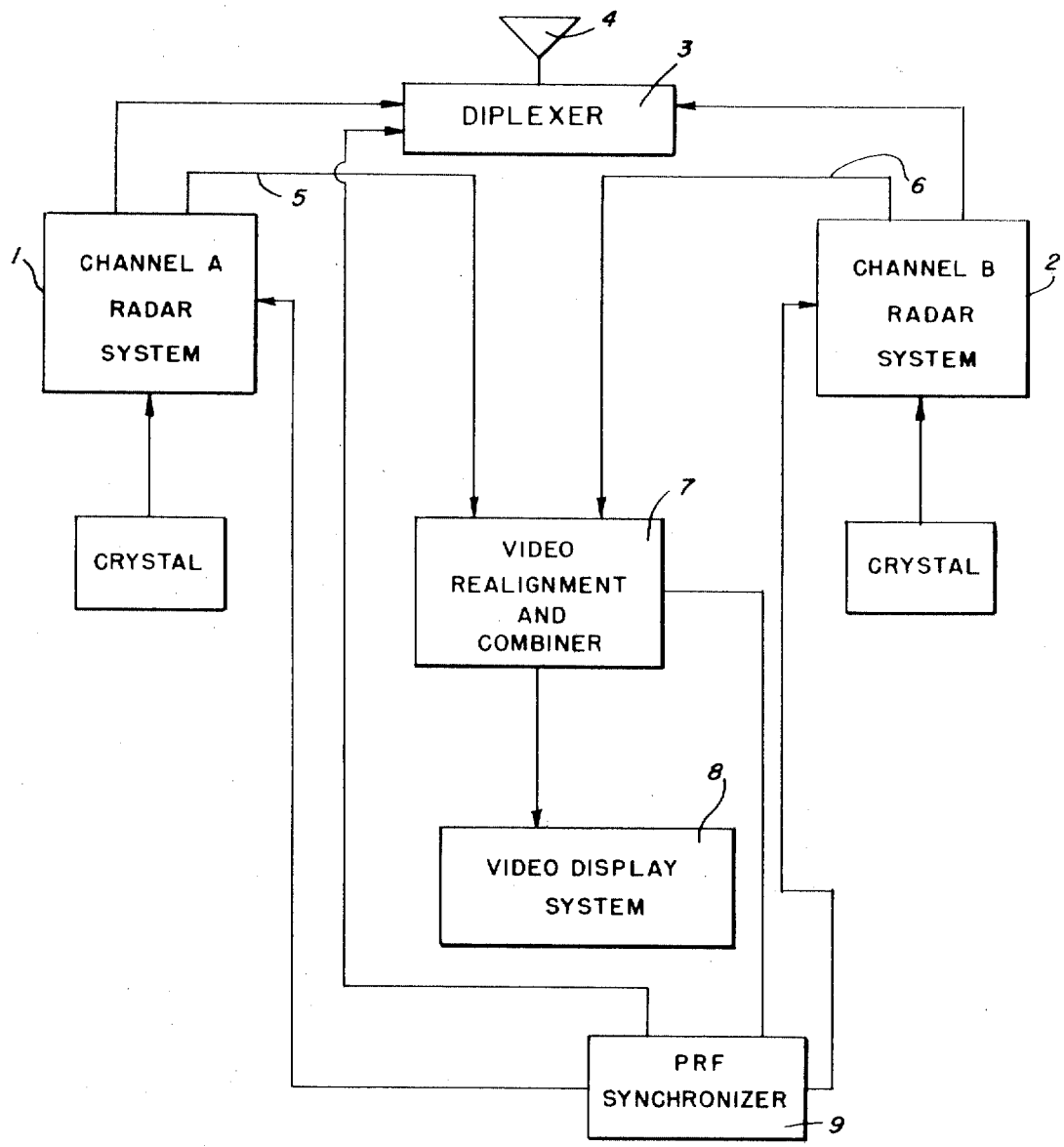

The invention comprises two separate crystal-controlled radar systems 1 and 2 operating on two different carrier frequencies and using two different pulse recurrence frequencies (PRF). The systems are connected through a diplexer 3 to a common antenna 4, and PRF synchronization means 9 are provided to insure that both transmitters do not fire at the same time. The receiver video outputs 5, 6 of FIG. 1 are connected to a video realignment and combining means 7, and the combined video output from 7 is applied to a video display system 8 to obtain a usable video display. Each radar system is provided with MTI processing circuitry to remove second-time-around echo since each radar system is coherent from one listening period to the next.

The video realignment and combining means 7 serves to properly align the video information from each channel so that the two video signals can be combined and presented to a display system. Another embodiment of a video realignment and combining means is shown in FIG. 2. FIG. 2 illustrates a system identical with that shown in FIG. 1 except that a means for optically realigning and combining the video outputs from the two radar systems is shown. The realignment and combining means comprises two conventional cathode-ray display scopes 10, 11 connected to video outputs 5, 6 respectively and positioned so that the scope faces are adjacent and perpendicular to one another, a half-silvered mirror 12 positioned so that light from the scopes 10, 11 strikes the opposite sides of the mirror at a 45° angle, and a conventional television camera 13 and display scopes 14.

The output from each respective radar channel is recorded on its associated scope 10 or 11. This scope display presents the target information in aligned form, and the video outputs are combined through the half-silvered mirror 12 and are displayed through a conventional television camera 13 and its associated receiver scopes 14. This represents only one method of achieving realignment and combination, and others would be obvious to one skilled in the art. For example, the video information from each radar system could be converted to digital form, stored in memory, read out at the proper time for realignment and added to obtain a combined video output. Alternatively, each video signal could be converted to optical form, scanned by a television camera, and the resulting electrical signals added to obtain the combined video signal.

I claim:

1. A radar system for eliminating second-time-around echoes and "blind speed" problems comprising a first coherent radar system employing Moving Target Indicator circuitry and operating on a first carrier frequency and a first pulse recurrence frequency, a second coherent radar system employing Moving Target Indicator circuitry and operating on a second carrier frequency and a second pulse recurrence frequency, a common antenna system, means for realigning and combining the video output signals from said first and second radar systems to provide a combined video signal, and means to display said combined video signal.

2. The device of claim 1 in which synchronization means are provided to prevent simultaneous firing of said first and second radar systems.

3. The device of claim 1 in which said video realigning and combining means comprises a first cathode-ray display scope displaying the video output from said first radar system, a second cathode-ray display scope displaying the video output from said second radar system, said first and second display scopes positioned so that the faces of scopes are in perpendicular relationship to a half-silvered mirror positioned so that light from each of said first and second display scopes strikes opposite sides of said mirror at a 45° angle, a television camera adapted to display the video output from said television camera.

* * * * *